United States Patent
Liu et al.

(10) Patent No.: US 10,009,222 B2
(45) Date of Patent: Jun. 26, 2018

(54) INPUT METHOD ENGINE MANAGEMENT FOR EDGE SERVICES

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 15/084,611

(22) Filed: Mar. 30, 2016

(65) Prior Publication Data

US 2017/0288957 A1    Oct. 5, 2017

(51) Int. Cl.
*G06F 15/16* (2006.01)
*H04L 12/24* (2006.01)
*H04L 12/26* (2006.01)

(52) U.S. Cl.
CPC .......... *H04L 41/0803* (2013.01); *H04L 43/16* (2013.01)

(58) Field of Classification Search
CPC .......................... H04L 41/0803; H04L 43/16
See application file for complete search history.

(56) References Cited

U.S. PATENT DOCUMENTS

| | | |
|---|---|---|
| 6,996,616 B1 | 2/2006 | Leighton et al. |
| 7,290,029 B2 | 10/2007 | Tang et al. |
| 8,892,686 B1 | 11/2014 | Thibeault et al. |
| 9,743,356 B2 * | 8/2017 | Lee ................... H04W 52/0229 |
| 2003/0135509 A1 | 7/2003 | Davis et al. |

(Continued)

FOREIGN PATENT DOCUMENTS

WO    2011127788 A1    10/2011

OTHER PUBLICATIONS

Jia et al., "KySS 1.0: a Framework for Automatic Evaluation of Chinese Input Method Engines," International Joint Conference on Natural Language Processing, Oct. 14-18, 2013, pp. 1195-1201, Nagoya, Japan.

(Continued)

*Primary Examiner* — Moustafa M Meky
(74) *Attorney, Agent, or Firm* — Daniel C. Housley

(57) ABSTRACT

A method for managing deployment of input method engines (IMEs) to computing devices in proximate relation to endpoint devices within a data communication network includes receiving software logic data indicating deployment rules for deploying an IME executing on a first computing device in the data communication network to a second computing device in the data communication network. The method further includes receiving a software data structure identifying configuration preferences of a user of an endpoint device. The method further includes monitoring the usage of the IME. Monitoring may include obtaining usage data associated with the user's access to the IME through the second computing device. The method additionally includes determining, based on the monitoring and the software logic data and the software data structure, whether the threshold condition is satisfied and deploying the IME to the second computing device in when that the threshold condition is satisfied.

20 Claims, 7 Drawing Sheets

(56) References Cited

U.S. PATENT DOCUMENTS

| | | |
|---|---|---|
| 2004/0205162 A1 | 10/2004 | Parikh |
| 2011/0314091 A1 | 12/2011 | Podjamy |
| 2014/0136952 A1 | 5/2014 | Zhu et al. |
| 2015/0113157 A1 | 4/2015 | Chan et al. |
| 2015/0249586 A1 | 9/2015 | Byers et al. |
| 2015/0358909 A1* | 12/2015 | Lee .................. H04W 52/0229 370/329 |

OTHER PUBLICATIONS

Su et al., "On the Identification Device Management and Data Capture via WinRFID Edge-Server," IEEE Systems Journal—ISJ-8, Received May 21, 2007, Accepted Aug. 1, 2007, 10 pages.

Unknown, "Edge 2016: The Future Has Never Been Clearer," Akamai Edge Conference, The Premier Global CDN and Cloud Services Event, Oct. 17-21, 2015, San Francisco, CA, 3 pages, printed Jan. 13, 2016. https://www.akamai.com/us/en/about/events/edge-conference/.

Unknown, "HTTP Proxy Caching," Apache Traffic Servicer 4.2.x documentation, printed Jan. 13, 2016, 16 pages https://docs.trafficserver.apache.org/en/4.2.x/admin/http-proxy-caching.en.html.

Liu et al., "Proactive Input Method Engine Management for Edge Services Based on Crowdsourcing Data", U.S. Appl. No. 15/084,629, filed Mar. 30, 2016.

List of IBM Patents or Patent Applications Treated as Related, dated Mar. 28, 2016, pp. 1-2.

* cited by examiner

INPUT METHOD ENGINE MANAGEMENT FOR EDGE SERVICES

BACKGROUND

The present disclosure relates to computer networking, and more specifically, to managing the deployment of input method engines to computing devices within a data communications network to facilitate endpoint user access.

Data communication networks provide an architecture for enabling computing devices (e.g., endpoint devices) to access resources and computing services from one or more remote network connected computing device (e.g., servers) within the network. The network connected computing devices may include one or more computer servers, with each computer server typically having access to vastly more computing resources, and being able to provide more computing services, than a given endpoint device. An endpoint device may communicate with these servers via network communication channels logically connecting the endpoint device to the servers via one or more networked computing devices. When the communication channel is sufficiently efficient, the endpoint device may use the network connected computing devices associated with the data communication networks to offload computing tasks to one or more of the servers via the provided resources or services. The efficiency of a communication channel may be a measure of a communication latency between a given endpoint device and a destination networked connected computing device.

SUMMARY

According to embodiments of the present disclosure, a method for managing deployment of input method engines (IMEs) to computing devices in proximate relation to endpoint devices within a data communication network may include receiving software logic data indicating deployment rules for deploying a first IME executing on a first computing device in the data communication network to a second computing device in the data communication network. The deployment rules indicate a threshold condition for deploying the first IME to the second computing device. The method may further include receiving a software data structure identifying configuration preferences of a user of an endpoint device. The configuration preferences associate the user with a configuration of the first IME, where the user's accesses the first IME is routed in the data communication network through the endpoint device and second computing device. The method may further include monitoring the usage of the first IME. Monitoring may include obtaining usage data associated with the user's access to the first IME through the second computing device. The method may further include determining, based on the monitoring and the software logic data and the software data structure, whether the threshold condition is satisfied and deploying the first IME to the second computing device in response to determining that the threshold condition is satisfied.

Various embodiments are directed towards a system and a computer program product for managing deployment of input method engines (IMEs) to computing devices in proximate relation to endpoint devices within a data communication network.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
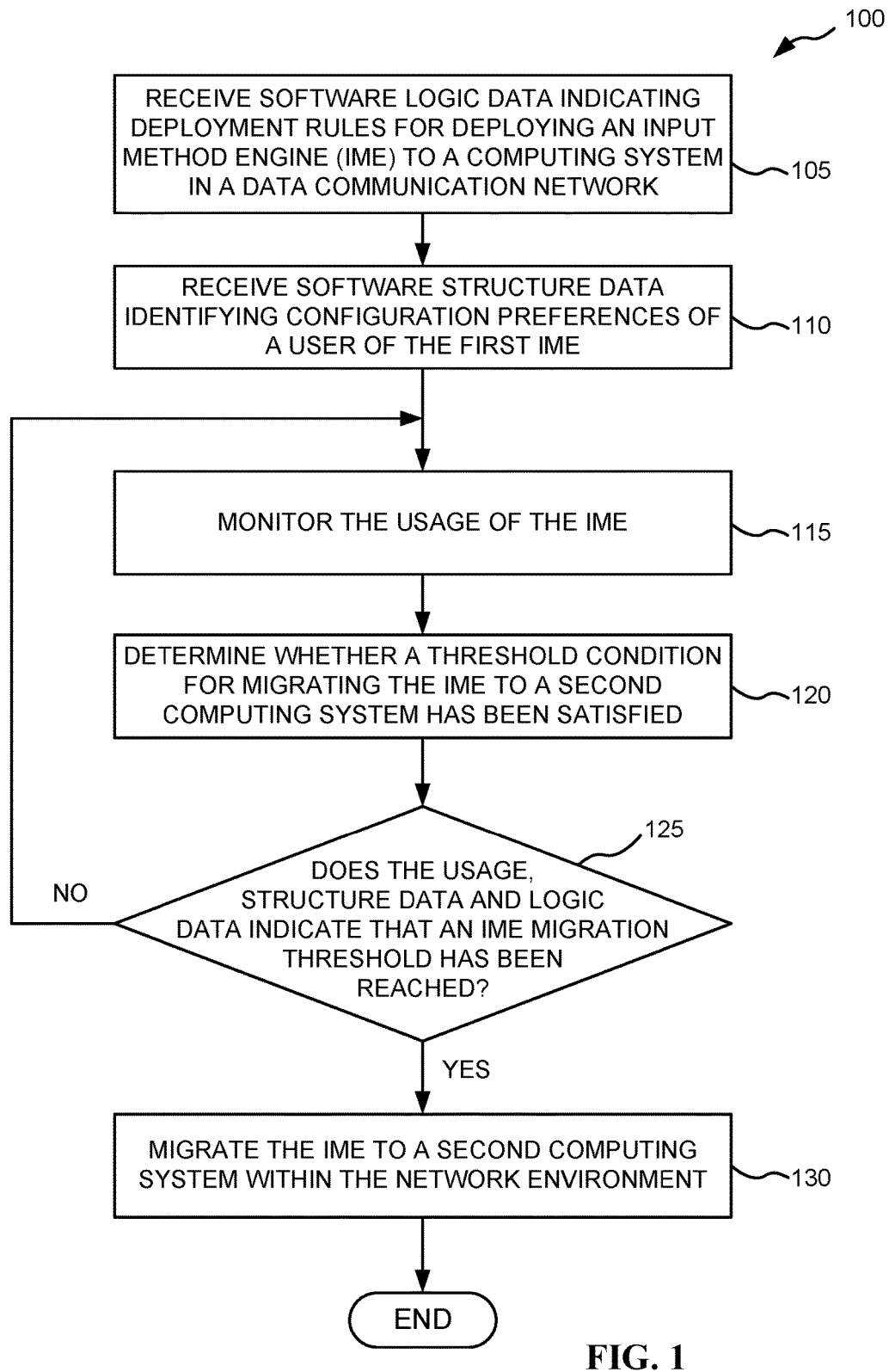
FIG. 1 depicts a flowchart of a set of a computer implemented operations for managing the deployment of an online input method engine relative to an endpoint computing device in a data communications network, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer networking, more particular aspects relate to managing the deployment of an input method engine to computing devices within a data communication network to facilitate endpoint user access. While the present disclosure is not necessarily limited to such applications, various aspects of the disclosure may be appreciated through a discussion of various examples using this context.

Endpoint devices may include user controlled computing devices such as mobile phones, laptops, fitness trackers and other wearable devices. Because an endpoint device may generally be associated with a user, the terms "endpoint device," "user," and "user of an endpoint device" may be used synonymously in the present disclosure. An endpoint device may include input hardware components to provide users with one or more modes of inputting to input information into the devices. Examples of input hardware components include audio sensors such as microphones, and tactile devices such as keyboards (e.g., a QWERTY or Latin keyboard) and tactile hardware such as touch pads. The type of input hardware components available on an endpoint device may depend on the type device being used, the type of information being entered into the device, and the spoken or written language of the user of the device. A user of an endpoint device whose written language is based on a relatively small set of symbols (e.g., the 26 characters of the English alphabet) may use a Latin keyboard to enter text into an endpoint device configured for communicating electronic messages. Conversely, a user of an endpoint device whose written language is based on a larger set of symbols (e.g., the thousands of characters of the Chinese, Japanese, and Korean languages) may enter text (e.g., symbols or characters) using, for example, a stylist and a tactile pad through a hand writing recognition input method engine, a Romanized input method engine over a Latin keyboard, or any other IMEs.

One or more input method engines may be associated with each input hardware component included in an endpoint device. An input method engine (IME) may include software components consisting of computer executable code which may be executed by a computer processor to receive input from an input hardware component and convert the received input to data that may be interpreted or further processed by other components of an endpoint device (e.g., the operating system, other software applications, and hardware components). A Japanese language input method engine, for example, may receive combinations of characters (symbols, letters, strokes, or character codes) entered on a Latin keyboard (e.g., a QWERTY keyboard). The Japanese language IME may process the received characters to generate Japanese Kanji symbols, and provide these generated symbols to other applications (e.g., an operating system) as input to be further processed. A given IME may be adapted or configured to interface with, or process input received from, a particular type of input hardware component (e.g., a Latin keyboard or a touch pad). An IME so adapted, may be further configured to process or interpret the received input according to the structure or rules of a given spoken or written language. Consequently IMEs may be available in various configurations to working varying combinations of input hardware and languages.

The computing resources required to support the various IME configurations may exceed the processing and storage capabilities of some endpoint devices. Consequently, IMEs may be provided as a service by network connected IME servers. An endpoint device may access a remote or online IME service over a data communication network by interfacing with, for example, a software application or operating system driver, configured to transmit input data to, and receive processed data from, the IME server. The quality of online IME services may be influenced by how the services are deployed in the network relative to the accessing endpoint devices (e.g., the physical or logical distance between an IME server and an endpoint device, and the number of intervening computing devices required to establish a communication channel between an IME server and an endpoint device). Service quality may include a measure of the security of input data communicated between the online IME service and the endpoint device. Service quality may further include a measure of network latency, including, for example, the lag (e.g., the difference in time) between the transmitting input data to the IME service (or IME server) and receiving processed output of the IME service. Service quality may additionally include a measure of other properties (e.g., bandwidth, congestion, and network load) of the data communication network and communication channel connecting an IME service to an endpoint device.

In addition to the properties of the data communication network, service quality may be influenced by the usage profile of a user of an IME service. A user of an IME server provided from an IME server based in China may experience varying levels of service depending on whether the user accesses the online IME service from a location in China close to the server or from a location in California. Similarly, a user may experience varying levels of service based on the frequency with which he uses a service, the type of service he regularly uses (e.g., types of inputs provided and outputs expected), and the uniqueness of his usage profile (e.g., can opportunities for crowd sourcing be exploited).

Embodiments of the present disclosure are based on the recognition that access to online IMEs may be improved by selectively deploying IMEs from IME servers within a data communication network to networked connected computing devices (e.g., edge servers) located at the periphery of the network relative to an accessing endpoint device based on user demand analysis. Accordingly, the present disclosure presents an architecture (e.g., methods, systems, and computer program products) for managing the deployment of online IMEs in a data communication network. The architecture includes an IME server for storing online IMEs and for providing network access to instantiations of these executing on the server. The architecture may further include an IME service manager to receive user demand data associated with an IME (e.g., an online IME) and, based on the demand data and deployment rules associated with the IME, temporarily deploy the IME to execute on an edge server to improve the quality of service provided by the IME. In some embodiments, an in-demand IME (e.g., an IME that currently being used by a threshold number of users) may be temporarily deployed to execute on an edge server that is physically or logically closer the source of the demand (e.g., an endpoint device) than the original executing IME server. As the IME falls out of demand (e.g., a user demand falls below a threshold value) the IME may be redeployed to execute on the original executing IME server. In some embodiments, the IME may be removed from an edge server.

As used herein, a network service is an application executing on a network connected computing device (e.g., a server) to provide data storage, manipulation, presentation, communication or other computing resources via a server-client architecture. An IME service may be a network service which executes on an IME server or other networked computing device. An IME service may, for example, receive input from an endpoint computing device and return an output which may serve as input to one or more applications on the endpoint device. An IME service (or online IME) may further refer to a software application having computer executable code implementing an IME and executing on a networked connected computing device.

As used herein, an IME server may be a network connected computing device configured to store and execute one or more IME software applications. In some embodiments, an IME server may load, configure, and execute instantiations of IMEs as local processes. In other embodiments, an IME server may configure and deploy particular instantiations of IMEs to execute on remote computing systems or servers. IME servers maybe physically or logical located within the periphery of a data communication network.

As used herein, an edge server may be a network connected computing device that resides (or is installed) at the periphery of a data communication network. An edge server, for example, may serve as an access point between a data communication network and an endpoint computing device. Such an edge server may relay network service access transactions between, for example, an IME server within a data communication network and an endpoint device. Some edge servers may include computing resources for executing processes for proving network services (e.g., IME services) directly to endpoint devices.

A network connected device may be a computing device having one or more network interface cards or other devices for communicating information over a data communication network. The network interface card may interface with a data communication network using a wireless radio, metallic wires, and/or fiber optic cables.

Referring now to the figures, FIG. 1 depicts a flowchart 100 of a set of a computer implemented operations for managing the deployment of online IMEs relative to an endpoint device in a data communications network, according to various embodiments. The set of computer implemented operations may be executed to, for example, determine when to deploy an IME service from an IME server to an edge server to improve service (e.g., quality of service to one or more endpoint computing devices). In certain environments, deploying an IME to an edge server may improve service to a user by, for example, reducing the communication lag between the IME server and an endpoint device.

Figure 7:
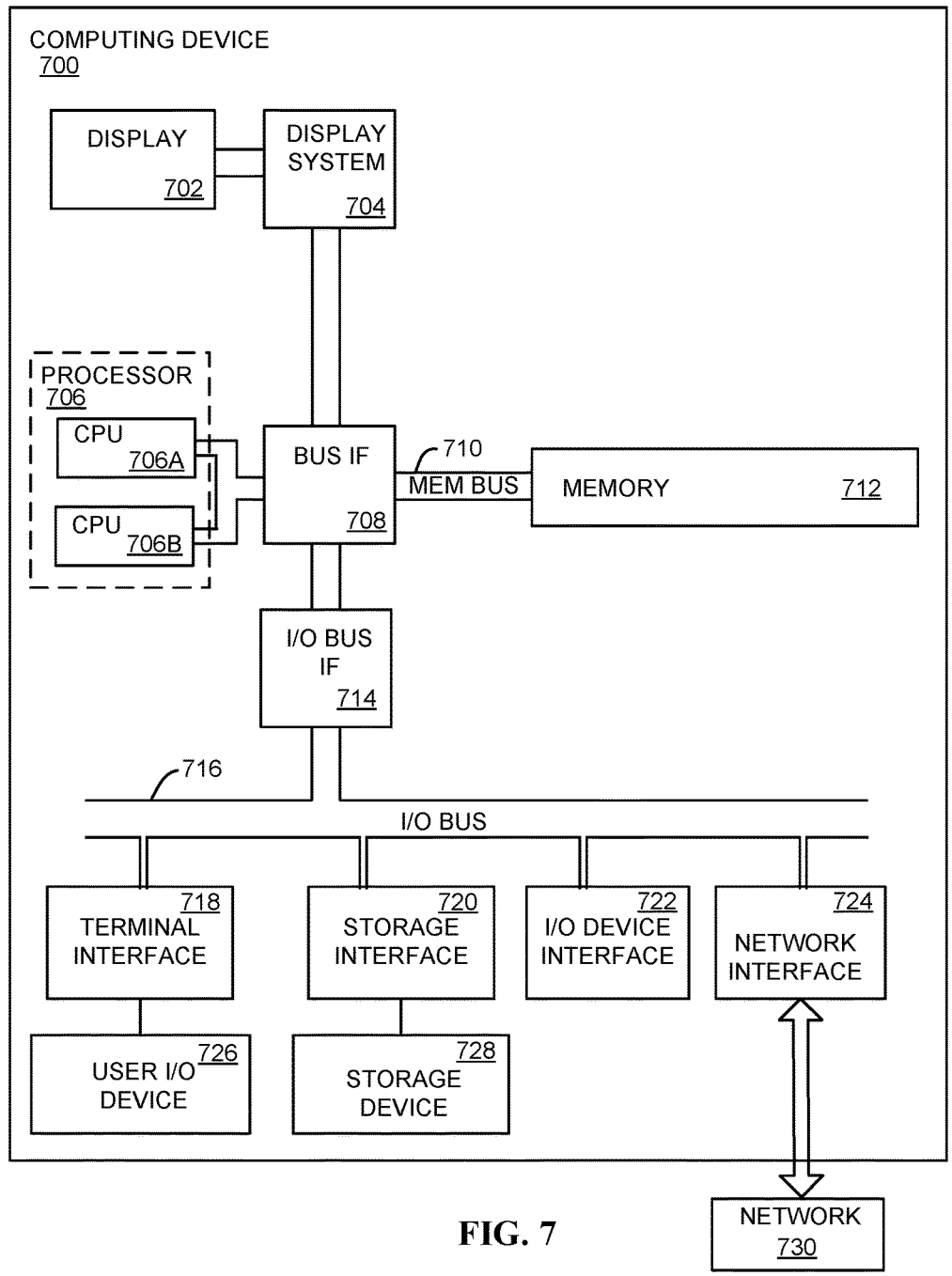
FIG. 7 depicts a block diagram of a computing system suitable for executing the computer implemented operations for managing the deployment of online input method engines, according to various embodiments.

In some embodiments, the set of computer implemented operations shown in flowchart 100 may be implemented in computer executable code embodied in one or more software applications executing in a computing device (e.g., an IME servers and edge servers), such as the computing device 700 (FIG. 7). In certain embodiments, at least some of these computer implemented operations may be implemented in one or more electronic circuits associated the computing device. The execution of the set of computer implemented operations may be orchestrated, or managed, by an IME service manager software application (hereinafter, "service manager") executing on the computing device. In some embodiments the one or more software applications or electronic circuits may be components of the service manager. The service manager may facilitate the exchange of data and control information between its constituent components. The service manager may be an embodiment of the service manager 420, described in association with FIG. 4. The service manager may communicate with each component by writing to, and reading from, data structures in the memory of the computing device, or by inter-process communication via software sockets. Furthermore, the manager may communicate with remote computing systems (e.g., IME servers, edge servers, and endpoint computing devices) via network interfaces connected to a data communication network.

The service manager may execute operation 105 by receiving software logic data indicating deployment rules for deploying a first IME, executing on an IME server (e.g., a first computing device in the data communication network), to an edge computing device (e.g., a second computing device in the data communication network). The software logic data may include data structures, digital files, and database tables. The service manager may receive the software logic data from a memory of a computing system, a storage system accessible to the service manager, and from a remote computing system via a data communication network. In certain embodiments, the software logic data may be generated or programmed by a system administrator.

The first IME may be an IME service or a particular embodiment or configuration of an IME application executing on an IME server. The first IME, for example, may be an IME service configured to receive input representing digitized audio input captured by an audio input hardware associated with an endpoint device. The first IME may be further configured to process the received data to generate one or more textual characters or symbols, and provide them to the endpoint device. In some embodiments, the first IME may receive input from, and provided generated output to, a plurality of endpoint devices. In particular embodiments, the communication between the first IME and the endpoint devices may occur through an edge server. In certain scenarios, the communication latency between the edge server and the endpoint devices may be less than the communication latency between the IME server and the endpoint devices.

According to various embodiments, deployment rules associated with an IME may be organized in a set of IME service profiles (hereinafter, "service profiles"). A service profile may include a set of deployment rules indicating, for example, threshold conditions for deploying an IME to an edge server. The deployment rules received in operation 105, for example, may indicate that when three or more users access the first IME though a given edge server, the IME should be deployed (or pushed) to that edge server. A service profile may further include a set of deployment rules indicating, for example, threshold conditions for redeploying an IME from an edge server to an IME server. The deployment rules received in operation 105, for example, may indicate that when no endpoint device has used the first IME in the past 24 hours, the first IME should be removed from the edge server.

The deployment rules (or service profiles) may further include criteria for resolving resource contentions that may occur when deploying an IME to an edge server. A resource contention may exist when an edge server targeted for deployment of an IME lacks available (e.g., unallocated) resource for executing or hosting the IME. For example, a scenario may exist where two IMEs satisfy (e.g., exceed) threshold conditions for deployment to a given edge server. If the edge server's computing resources can only support one of the two IMEs, the deployment rules may provide a criteria for prioritizing one IME over the other. One such criteria may indicate that the resource contention may be resolved by weighting the thresholds or rules for the two IMEs differently. For example, when the deployment rules for two IMEs indicate that the IMEs should be deployed to an edge server when at least three endpoint computing devices access the IMEs via the edge server, the deployment rules may further indicate weighting factors that may change the deployment threshold for one of the two IMEs from three accesses to five accesses. The weighting factor may be applied, for example, to an IME that is either generally in lower demand or that may require less communication resources (e.g., bandwidth) than the other.

The service manager may execute operation 110 by receiving a software data structure identifying a set (e.g., one or more) of configuration preferences of a user of the first IME, where the user accesses the first IME service through an edge server. The software data structure may be received from an endpoint device, a storage system accessible to the service manager, or another network connected computing device. In some embodiments, an application (e.g., an IME client) executing on an endpoint device may transmit the software data structure to the service manager when the endpoint device initiates a communication session with an IME server. In other embodiments, the service manager may retrieve the software data structure from a storage system or from a memory of the IME server in response to receiving credentials for identifying or associating an endpoint device with a particular software data structure.

According to various embodiments, the configuration preferences may associate an endpoint device (or a user of an endpoint device) with a configuration of one or more IMEs (or IME services). The configuration preferences may include, for example, default IME settings, a logical or physical location, and IME switching rules for each user. The set of configuration preferences identified by the software data structure received in operation 110 may, for example, indicate that the default IME preference for the user of the first IME is an English audio IME (e.g., English speech recognition conversion), while secondary IME preference is a Simplified Chinese language IME. The set of configuration preferences may further indicate that the second preference may be selected (e.g., switched to) when processing handwriting input.

In some embodiments, configuration preferences may be explicitly created by, and associated with, a user of an endpoint device. In other embodiments, the configuration preferences may be extrapolated by the service manager based on usage.

The service manager may execute operation 115 by monitoring the usage of the first IME. Monitoring the usage of the first IME may include obtaining usage data associated with users' accesses to the first IME through a given access point. The usage data may include, for example, the number of users that access the first IME, the volume of network communication traffic associated with the first IME, and the type of IMEs being used within a given time. In some embodiments, the service manager may monitor the usage of the first IME by executing computer executable code to access areas of memory having data structures associated with the IME usage. The computer executable code may be further executed to intercept (or eavesdrop on) and interrogate communication packets used to facilitate communication between an IME and an endpoint device.

The service manager may execute operation 120 by determining, based on the monitoring executed in operation 115 and the software logic data and the software data structure received in operations 105 and 110, whether the threshold condition for deploying the first IME to the edge server is satisfied. Determining whether the threshold condition is satisfied may include executing one or more software routines to logically compare the deployment rules and associated thresholds conditions for the first IME to the usage data. In some embodiments, determining whether the threshold condition is satisfied may include mathematically applying weighting factors associated with the deployment rules, as described herein, to the usage data and threshold conditions before comparing the usage data to the threshold conditions.

At operation 125, the service manager may return to operation 115 in response to determining that the threshold conditions for deploying the first IME to the edge server were not satisfied. Alternatively, the service manager may proceed to operation 130 in response to determining that the threshold conditions for deploying the first IME to the edge server were satisfied.

The service system may execute operation 130 by deploying the first IME to the edge server. Deploying the first IME may include transferring computer executable code implementing the first IME over the data communication network to the edge server. In some embodiments, deploying the first IME may include transferring configuration information associated with the first IME, including deployment rules, to the edge server. In some embodiments, the computer executable code implementing the first IME may be modified by the configuration information before being transmitted to the edge server. Deploying the first IME to may further include configuring and executing the first IME on the edge server to enable the first IME respond to requests for the IME service from the endpoint device.

Figure 2:
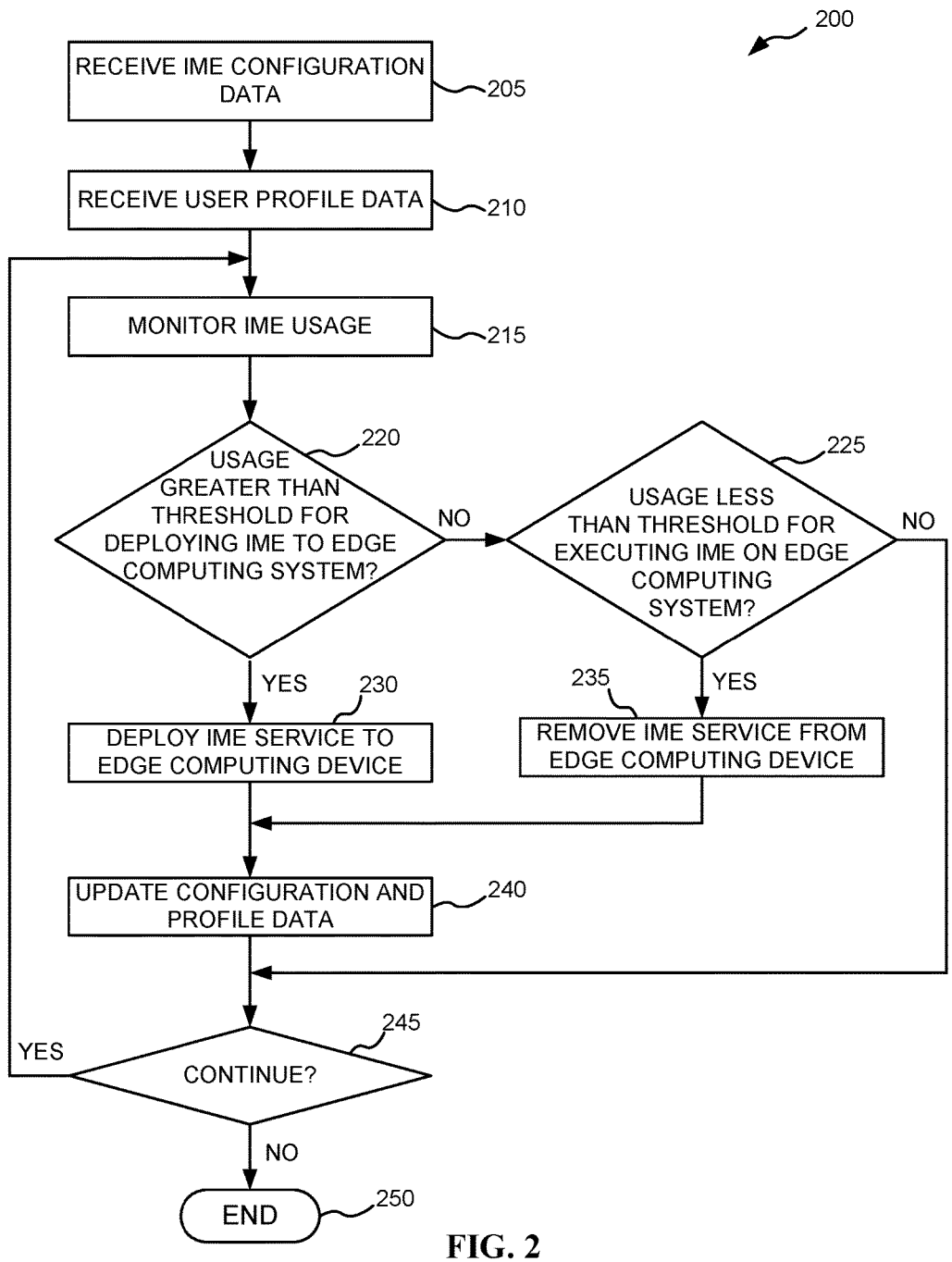
FIG. 2 depicts a flowchart of a set of a computer implemented operations for managing the deployment of a set of online input method engines relative to an endpoint device in a data communications network, according to various embodiments.

FIG. 2 depicts a flowchart 200 of set of a computer implemented operations for managing the deployment of online IMEs relative to an endpoint device in a data communication network, according to various embodiments. The set of computer implemented operations shown in the flowchart 200 may be executed by a service manager application executing on one or more network connected computing device, as described herein. Furthermore, set of computer implemented operations depicted in the flowchart 200 may be a variation of the set of computer implemented operations described in association with the flowchart 100 (FIG. 1). Some of the differences between the set of computer implement operations depicted in the flowchart 100 and the set of computer implemented operations shown in the flowchart 200 may be described herein.

The service manager may execute operation 205 by receiving IME configuration data (e.g., service profiles) for a set of IMEs executing on an IME server associated with the service manager. In some embodiments, the configuration data may include software logic data indicating deployment rules for deploying one or more IMEs executing on an IME server to an edge server, as described herein. In certain embodiments, the configuration data may include rules for sharing or merging configuration data and usage data between multiple IME servers. The shared configuration data may enable a service manager having components distributed amongst multiple IME servers to efficiently deploy IMEs to edge computing devices, as described herein.

Operation 210 may include substantially the same steps as operation 110. Consequently, in some embodiments, the service manager may execute operation 210 according the processed described for executing operation 110.

The service manager may execute operation 215 by monitoring IME usage as described for the execution of operation 115. In some embodiments, monitoring IME usage may include, in addition to the process described for the execution of operation 115, monitoring the usage of IMEs deployed to edge servers in the data communication network. In some embodiments, a component of the service manager executing on the edge servers may monitor, aggregate, and forward the IME usage data to a component of the service manager executing on the IME server or other network connected computing system.

The service manager may execute operation 220 by determining, based on the usage data monitoring executed in operation 215, whether an IME should be deployed to a given edge server. The service manager may, for example determine whether an IME should be deployed to an edge server by determining whether the IME's usage data indicate that usage (e.g., as described in association with the execution of operation 120 of FIG. 1) through a given edge server is greater than a threshold value (e.g., satisfies a threshold condition as determined by the configuration data received in operation 205) for deploying the IME to the edge server. The service manager may continue to operation 230 and deploy the IME to an edge server in response to determining that the IME should be deployed to the edge server, while the service manager may proceed to operation 225 in response to determining that the IME should not be deployed to an edge server.

At operation 225, the service manager may determine whether an IME previously deployed to an edger server should be removed from the edge server. In some embodiments, the service manager may determine whether an IME should be removed from an edge server by, for example, comparing the IME's usage to one or more threshold conditions for redeploying the IME, as described herein. The service manager may continue to operation 235 in response to determining that an IME should be removed from an edge server, while the service manager may proceed to operation 245 in response to determining that the IME should not be removed from an edge server.

The service manager may execute operation 235 by removing the IME identified for removal in operation 225 from an edger server. In some embodiments, removing the identified IME may include terminating or suspending execution of the IME's executing process on the edge server. In some embodiments, removing the IME may further include reconfiguring the edger server, or a component of the service manager executing on the edger server, to forward or relay communications sessions between a version of the removed IME executing on the IME server and endpoint devices accessing the version of the removed IME executing on the edge server to a corresponding instantiation of the removed IME executing on an IME server.

At operation 240, the service manager may update the IME configuration data to indicate, inter alia, that an IME has been deployed to, or removed from, an edge server. In some embodiments, user profiles may be updated to indicate, inter alia, changes in the user's IME usage pattern. The changes in the user's IME usage pattern may have precipitated the deployment of the IME deployed or removed in operations 230 and 235, respectively. As an example, the profile for a user may indicate that the user installed a first IME and a second IME on a mobile device for inputting Japanese characters. If the user uses the first IME for inputting a large set of Japanese characters, while using the second IME to input a smaller set of special characters (e.g., because the first IME is unable to input characters from this smaller set), the user profile may indicate that the first IME is the user's primary IME (e.g., due to greater usage of the first IME). A consequence of this indication may be that the first IME is deployed to an edge server close to the user whenever the user's usage satisfies a deployment threshold, as described herein. In the future, when the second IME is upgraded to support a complete set of Japanese characters (e.g., all the characters from both the large set and the smaller set), may switch to exclusively using the second IME (e.g., because the second IME is better than the first IME after upgraded on user experience, efficiency, and/or accuracy). This upgrade and change in usage may cause the second IME to become the primary IME, necessitating an update of both the edge profile and the user profile.

At operation 245, the service manager may determine whether to continue the operations of flowchart 200 at operation 215 or to proceed to operation 250 and end execution.

Figure 3:
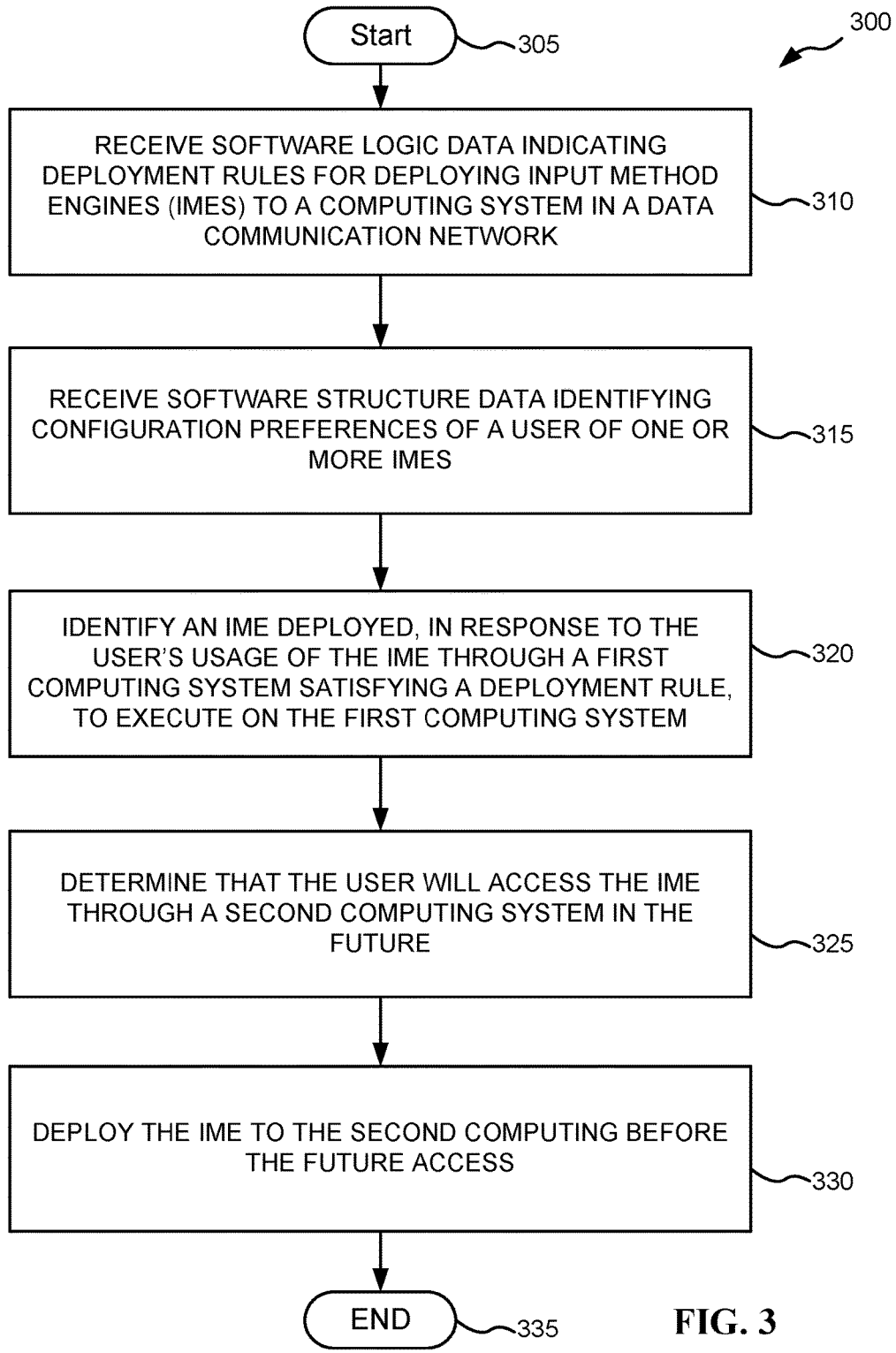
FIG. 3 depicts a flowchart of a set of computer implemented operations for preemptively deploying input method engines to computing devices in proximate relation to users of input method engines, according to various embodiments.
Figure 4:
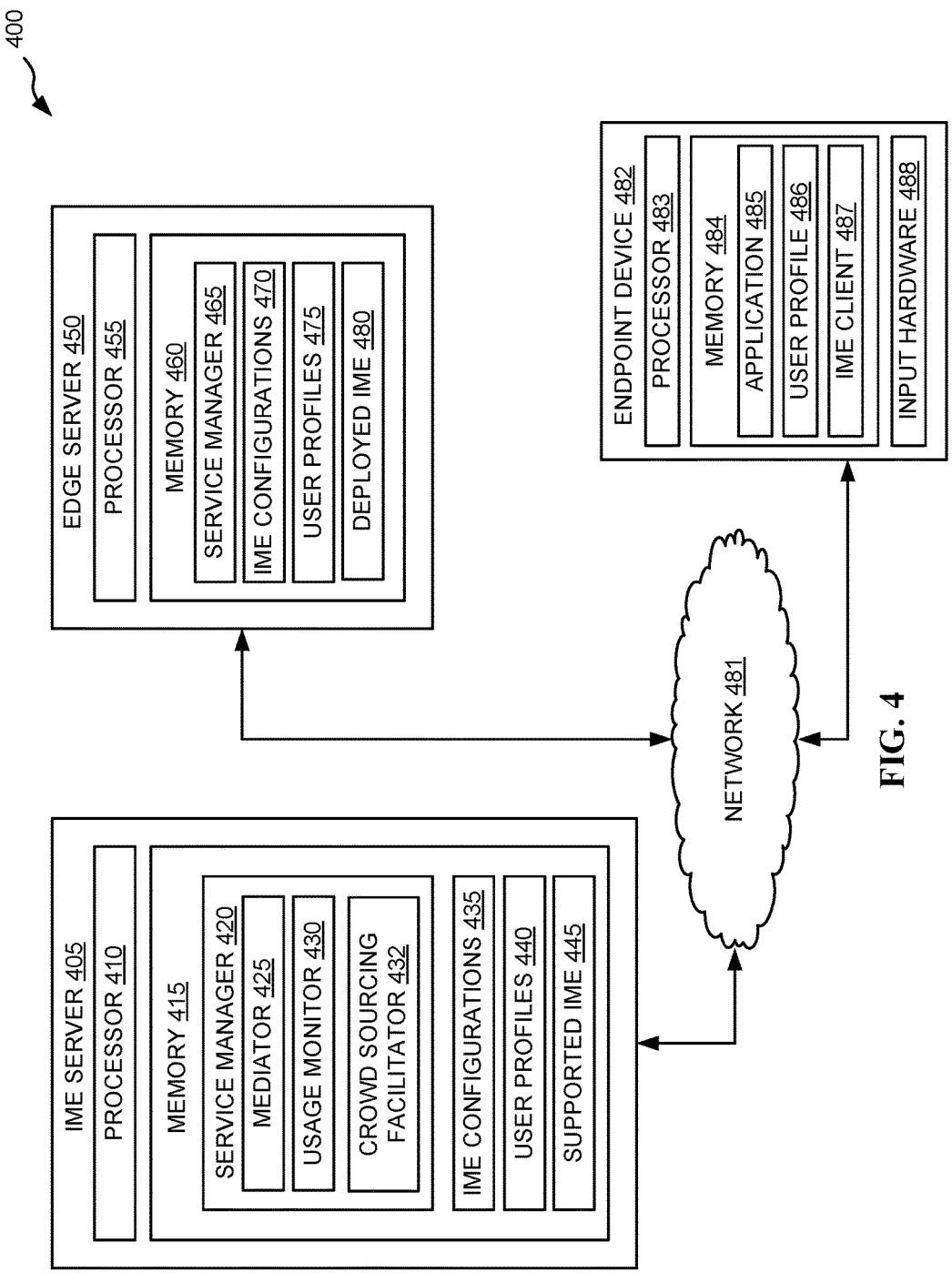
FIG. 4 depicts a block diagram of the components of an example system suitable for executing a set of computer implemented operations for managing the deployment of online input method engines described herein, according to various embodiments.

FIG. 3 depicts a flowchart 300 of a set of computer implemented operations for preemptively deploying input method engines to computing devices in proximate relation to users of input method engines, according to various embodiments. The set of computer implemented operations depicted in the flowchart 300 may be implemented in a service manager application and executed by one or more network connected computing device, as described herein. In some embodiments, at least one of the operations shown in flowchart 300 may be implemented in a facilitator application such as the crowd sourcing facilitator 432 (FIG. 4). In certain embodiments, the facilitator application may be a component of the a service manager application, while in other embodiments, the facilitator application may be an independent application executing one or more one or more network connected computing device. For the discussion of FIG. 3, the term service manager includes the facilitator application.

While the operations described in FIG. 1 and FIG. 2 may be executed to deploy IMEs to edge computing devices based on historic (e.g., past) and current usage of a user, the operations of flowchart 300 may be executed to preemptively deploy IMEs to edge computing devices. The storage system may preemptively deploy IMEs by using information regarding prior deployment of IMEs in response to a user's historic usage (e.g., accesses to the IMEs) to deploy IMEs to edge computing devices in anticipation of the user accessing the IMEs through the edge computing devices in the future. In some embodiments, the IMEs are deployed prior to the user accessing the IMEs through edge computing devices.

An example scenario where the operations of flowchart 300 may be executed includes three users (e.g., user-1, user-2, and user-3) who have a March 23 meeting in a first venue proximally located next to a first edge server (e.g., edge server 1). During the meeting, user-1 and user-2 respectively use input method engines IME-1, IME-2, and IME-2. The usage of each IME is such that they are deployed to the first edge server, according to the operations of FIG. 1 and FIG. 2. Subsequently, a follow-up meeting scheduled for one week later on March 30 between user-1 and user-2 at a second venue proximally located next to a second edge server (e.g., edge server 2). If the follow-up meeting is associated with the configuration profiles of user-1 and user-2, the service manager (or crowd sourcing facilitator) may execute the operations of flowchart 300 to deploy (e.g., configure and execute) the IME-1 and IME-2 on the second edge server before the March 30 meeting.

The service manager may begin the operations of the flowchart 300 by executing operation 305. Executing operation 305 may include executing one or more of the operations shown in FIG. 1 or FIG. 2 to deploy one or more IMEs to execute on computing devices with the data communication network.

The service manager may continue the operations of flowchart 300 by receiving software logic data indicating rules for deploying IMEs to an edge server (e.g., a first computing device) in the data communication network, as shown in operation 310. In some embodiments, operation 310 may be implemented and executed according the implementation and execution of operation 105 (FIG. 1). In addition to the description of the definition and examples of deployment rules provided in the discussion of FIG. 1 and FIG. 2, the deployment rules may include one or more criteria or threshold condition for preemptively deploying an IME to an edge server. The deployment rules may, for example, indicate that an IME deployed to an edge server based on a users' usage of the IME through the edge server, may be preemptively deployed to a second edge server based on anticipated usage of the IME through the second sever within a given period of time (e.g., two weeks). A second example deployment rule may enable a service manager to preemptively deploy an IME when the IME configuration and/or the user configuration preferences associated with the IME have not changed within a given period of time. Returning to the running example, this rule may require that user-1 and user-2's respective preferences for IME-1 and IME-2 do not change within a given time period.

The service manager may continue the operations of flowchart 300 by executing operation 315 to receive a software data structure identifying configuration preferences (or user profiles) of a user of IMEs, where configuration preferences associate the user with a configuration of one or more IMEs. In some embodiments, the user may be a member of a group of users. In these embodiments, the configuration preferences may associate the group of users with a configuration of one or more IMEs. A group, for example, may be formed when the service manager receives configurations preferences for two or more users that use the same IME configurations. Each of the two or more users (e.g., each member of the group), for example, may have configuration preferences identifying a Japanese language IME as their primary IME. The service manager may merge these common configuration preferences into a single software data structure associating the group of users with the Japanese language IME.

Operation 315 may be an embodiment of operation 110 (FIG. 1) or operation 210 (FIG. 2). The implementation, execution of operation 315 may be substantially the same as the implementation and execution of operations operation 110 (FIG. 1) and operation 210 (FIG. 2).

Receiving the software data structure may further include receiving prospective edge server access information. Prospective edge server access information may include, for example, scheduling information associated with a given user's profile (or the profile of a group of users) or configuration preferences. For a given user (or group of users), the scheduling information may indicate, for example, a time, date, and location (or venue) of future IME accesses. In some embodiments, the service manager may retrieve the scheduling information from a calendar application or database associated with a given user or endpoint device.

The service manager may continue the operations of flowchart 300 by executing operation 320 to identify an IME (e.g., a first IME) deployed to execute on the first computing device. In some embodiments, IME may be identified based on the configuration preferences received in operation 315. The IME may have been deployed execute on the first computing device in response to, for example, the user's access to the IME through the first computing device satisfying at least one of the set of threshold conditions discussed in operation 310. In some embodiments, the IME may be identified based on based on one or more configure preferences of a given user. For example, a deployed IME, configured for a given user, may be identified based on receiving scheduling information indicating that the user will use the IME in the future.

The service manager may continue the operations of flowchart 300 by executing operation 325 to determine, based on the configuration preferences received in operation 315 and/or scheduling information received in operation 315, that the user will access the IME identified in operation 320 through a second computing device in the future. Returning to the running example, on March 23 the service manager may determine that user-1 and user-2 will access IME-1 and IME-2 (currently executing on edge server 1) through edge sever 2 on March 30 based the configuration preferences of user-1 and user-2, and based on scheduling information about the follow-up meeting in the second venue. Edge server 2 may be identified through a map or database indicating the proximity of edge servers in a data communication network to a given location or venue.

The service manager may then continue the operations of flowchart 300 by executing operation 330 to deploy the first IME to second edge server (e.g., a computing device) before the future access. Execution of the operations of flowchart 300 my then end at operation 335.

In some embodiments, the service manager may execute operation 325 to determine that a second user (e.g., a different user from the user whose usage of the IME caused the IME to deployed to the first computing device) will access the IME identified in operation 320 through a third edge server (e.g., a third computing device) in the future. In these embodiments, the service manager may execute operation 330 to deploy the first IME to the third computing device.

FIG. 4 depicts a block diagram of components of an example system 400 suitable for executing a set of computer implemented the operations for managing the deployment of online input method engines, a described herein. The example system 400 includes IME server 405, edge server 450, data communications network 481, and endpoint device 482.

The data communication network 481 may be a packet switched computer network configured to transfer data between network computing devices via, for example, wired, fiber optic, and/or wireless communication links. In some embodiments, the data communication network 481 may include a set of one or more IME servers 405 and one or more edge servers 450. In certain embodiments, the data communication network 481 may further include additional computing devices for establishing communication channels between network connected devices. The additional computing devices may include signal processing and routing devices, including network switches, routers, and names servers.

IME server 405 may be a networked connected computing device having a processor 410 and a memory 415. The memory 415 may include computer executable code implementing the service manager 420 and a set of supported IMEs 445. In some embodiments, the computer executable code may be executed by processor 410. In other embodiments, at least some the computer executable code may be transmitted over data communication network 481 to a remote computing device for execution (e.g., an instance 445 may be transferred to edge server 450 for execution, as described herein). The memory 415 may further include user profiles 440 and IME configurations 435.

The service manager 420 may include one or more software applications, modules, or other software components implementing mediator component 425, usage monitor component 430, and crowd sourcing facilitator component 432. The mediator component 425 may be executed by the processor 410 to receive a software data structure identifying configuration preferences of a user of a first IME (e.g., an IME selected from the set of supported IMEs 445), as described herein. The configuration preferences may associate a user with a particular configuration of one or more services provided by the first IME (e.g., an IME service). In some embodiments, for example, the configuration preferences may associate a user with an English language IME configured to receive audio text as input and provide typographic text as output. In certain embodiments, the configuration preferences may further indicate, or associate a user with, a particular access point for accessing the first IME serve over the data communication network.

The usage monitor component 430 may be executed by the processor 410 to monitor the usage of IMEs executing on IME server 405. The usage may be monitored by, for example, execute one or more software routines to access areas of memory 415, or to intercept (or eavesdrop on) communication packets and associated artifacts used to facilitate communication between an IME serve and an endpoint device 482. The accessed memory and the intercepted communication packets may be interrogated by the usage monitor component 430, and cross-referenced with the user profiles 440 and IME configurations 435, to determine, for example, the identity and quantity endpoint devices using an IME, the access points or edge servers through which the IME is being accessed, and the volume of communications data being exchanged with the IME. Each of these metrics may individually, or collectively, determine the usage of an IME. In some embodiments, the usage monitor 430 may make the usage data available to service manager 420 through a shared memory access, or intra (or inter) process communications (e.g., software socket communication).

The crowd sourcing facilitator component 432 may be executed by the processor 410 (or the processor 435) to receive IME deployment and IME configuration information from IME server 405 or one or more edge server 450. The crowd sourcing facilitator component 432 may further receive user configuration preferences or user profile information from endpoint device 482, IME server 405, edge server 450, and other computing devices within the data communication network. In some embodiments, the received user configuration preferences or user profile information may include scheduling information, as described herein. The crowd sourcing facilitator component 432 may aggregate this data from one or more sources (e.g., one or more edge servers 450 and endpoint devices 482). The data may then be analyzed to identify, on the behalf of the service manager, one or more deployed IMEs 480 executing on a first edge server 450 to provide an IME service to one or more users. The crowd sourcing facilitator component 432 may further evaluate the data to determine that the one or more users will access the deployed IMEs 480 through a second edge server 450 in the future. The crowd sourcing facilitator component 432 or the service manager 420 may then preemptively deploy the IMEs 480 to the second edge server 450. Preemptively deploying the IMEs 480 may include deploying the IMEs before the one or more users accesses them through the second edge server 450.

The service manager 420 may execute one or more software routines to receive software logic data having deployment rules for deploying one or more of supported IMEs 445 (e.g., a first IME) to one or more edge server 450. The software logic data may be retrieved by, for example, accessing an area of memory 415, querying a storage system (not shown), or retrieving one or more data packets from another remote compute system (e.g., another IME server 405 or edge server 450). The service manager 420 may then determine, based on the monitoring executed by usage monitor 430, the software logic data, and the software data structure, whether one or more threshold condition system for deploying a supported IMEs 445 to, or for redeploying a previously deployed IME from, edge server 450 is satisfied, as described herein. The service manager 420 may deploy a one or more of the supported IMEs 445 to an edge server in response to determining that a deployment threshold condition is satisfied. Furthermore, the service manager 420 may remove a previously deployed IME from an edge server 50 in response to determining that a redeployment threshold condition is satisfied.

Edge server 450 may be a networked connected computing device having a processor 455 and a memory 460. In some embodiments, the edge server 450 may be an access point to data communication network 481, configured to establish and relay IME communication sessions between endpoint device 482 and IMEs executing on IME server 405. In particular embodiments, the edge server 450 may provide an IME service directly to an endpoint device, as described herein.

In some embodiments, the memory 460 may include service manager 465, IME configurations 470, user profiles 475 and deployed IMEs 480. In some embodiments, the service manager 465 may include distributed components of the service manager 420. The distributed components may, for example, include a mediator component and usage monitor component for respectively, executing the configuration information receiving and usage monitoring operations described herein. The service manager 465 may further include software routines, executable by the processor 455, to configure, execute, and terminate deployed IMEs 480. The service manager 465 may additionally include software routines executable by processor 455 to exchange IME usage information, IME configurations (e.g., software data structures), and user profiles between service manager 420 and service manager 465.

Endpoint device 482 may be a network connected computing device associated with a user of an IME service. Examples of endpoint devices 482 may include cellular telephones, electronic book readers (e.g., e-book readers), and personal laptop computers. The endpoint device 482 may include a processor 483, memory 484, and input hardware 488 (e.g., a touch screen and associated driver software). The memory 484 may include application 485, user profile 486 and IME client application 487. The IME client application 487 may execute on the processor 483 to receive input (e.g., digital representations of electronic signals, or information symbols) from input hardware 488. The IME client application 487 may forward the received input to an identified (or selected) IME (e.g., deployed IME 480) for processing. An IME may be identified based on user preferences indicated in user profile 486. In some embodiments, the IME client 487 may receive a processed output from the identified IME and provide it to application 485 for further processing. In certain embodiments, the application 485 may be an operating system.

Figure 5:
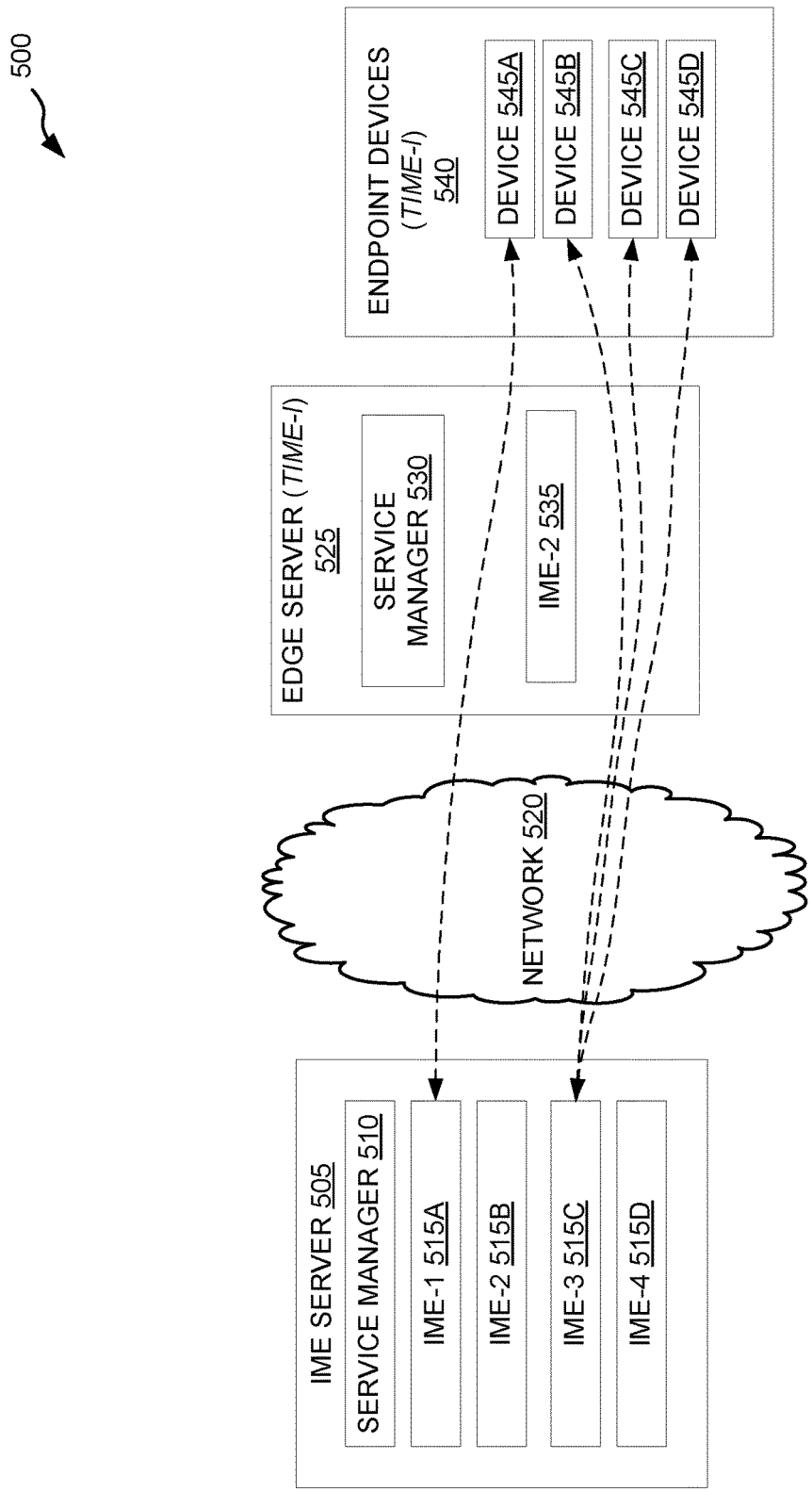
FIG. 5 depicts a block diagram of an example computing environment illustrating a set of endpoint devices accessing a set of online input method engine services provided by an input method engine server via a network connection through an edge server, according to various embodiments.

FIG. 5 depicts a block diagram of an example computing environment 500 illustrating a set of endpoint devices accessing a set of online IMEs executing on an IME server via a network connection through an edge server, according to various embodiments. The example computing environment 500 includes IME server 505, data communication network 520, edge server 525 and endpoint devices 540.

According to the instant example, the IME server 505 includes service manager 510 and four IMEs (e.g., IME-1 515A, IME-2 515B, IME-3 515C and IME-4 515D). The edge server at time instant Time-I includes service manager 530 and a deployed IME, IME-2 535. In some embodiments, the service manager 530 may include distributed components of the service manager 510. In certain embodiments, IME-2 535 may be an instance of IME-2 515B deployed to execute on edge server 525. At time instant time-I, endpoint devices 540 include four independent endpoint devices associated with individual users (e.g., device 545A, device 545B, device 545C, and device 545D). In the instant example, the physical or logical distance between the edge server 525 and endpoint devices 540 may be less than the physical or logical distance between IME server 505 and endpoint devices 540.

At time instant time-I device 545A accesses IME-1 515A on IME server 505 via a data communication channel relayed through edge server 525. Similarly, devices 545B, 545C, and 545D each access IME-3 515C through data communication channels relayed through edge server 525 to IME server 505. Furthermore, during time instant time-I no devices (e.g., no endpoint devices or users of endpoint devices) access IME-2 535. The service manager 510 and 530 may monitor the usage of IME-1 515A, IME-3 515C and deployed IME-2 535 to according to the methods described herein to determine whether one or more IMEs should be deployed or removed.

Figure 6:
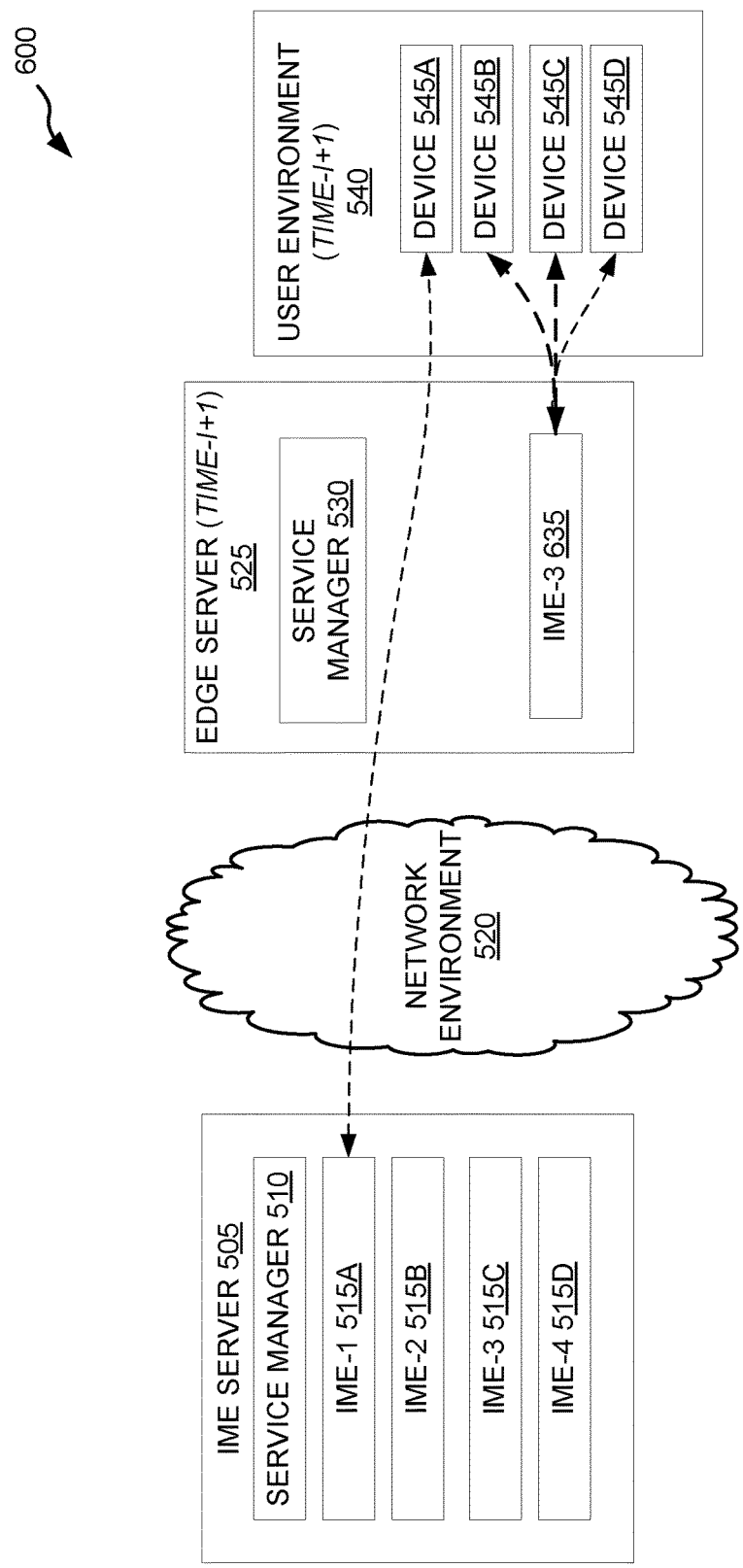
FIG. 6 depicts a block diagram of an example computing environment illustrating a set of endpoint devices accessing an online input method engine service that was migrated from an input method engine server to an edge server consistent with the computer implemented operations described herein, according to various embodiments.

FIG. 6 depicts a block diagram of an example computing environment 600 illustrating a set of endpoint devices accessing an online IME that was migrated from an IME server to an edge server consistent with the computer implemented operations described herein, according to various embodiments. The example computing environment 600 may be substantially the same computing environment as the example computing environment 500, with differences reflecting a change in state of the edge server 525 and the communication channels through the data communication network 520 due to a time progression from time instant time-I to time instant time-I+1. The state of the edge server 525 and the communication channels through the data communication network 520 have been updated according to the methods of the present disclosure.

The differences between the example computing environment 500 and the example computing environment 600 can be explained as follows. The service manager monitored, during time instant time-I, the usage of each IME executing on the IME server 505 and each IME deployed to, and executing on, the edge server 525. Concurrent with the monitoring, the service manager evaluated or compared the usage of each IME to one or more deployment rules (or threshold condition), as described herein. In the present example, a first deployment rule may indicate that when two or more users (or endpoint devices) access an IME executing on the IME server 505 via edge server 525 for at least one time period, the accessed IME should be deployed to the IME server 525. Additionally, a second deployment rule may indicate that when an IME is deployed to an edge server (e.g., a deployed IME) is not accessed for at least one time period, the deployed IME should be removed from the edge server.

Based on the established deployment rules for the current and the usage monitoring, the service manager removed deployed IME-2 535 (FIG. 4) from edge server 525 because it was not accessed for the time period between time instant time-I and time-I+1. Additionally, the service manager deployed IME-3 635 to the edge server 525. Deployed IME-3 635 is an instance on IME-3 515C. Further, the service manager updated the configuration data for deployed IME-3 635 and the profile data associated with devices 545B, 545C, and 545D to ensure that communications between the users and the IME are serviced by edge server 525, rather than being relayed to IME server 505.

FIG. 7 depicts a block diagram of a computing system 700 suitable for executing the computer implemented operations for managing the deployment of online input method engines, according to various embodiments. The computing system 700 may be an embodiment of IME server 405, edge server 450, and endpoint device 482. The components of the computing device 700 can include one or more processors 706, a memory 712, a terminal interface 718, a storage interface 720, an Input/Output ("I/O") device interface 722, and a network interface 724, all of which are communicatively coupled, directly or indirectly, for inter-component communication via a memory bus 710, an I/O bus 716, bus interface unit ("IF") 708, and an I/O bus interface unit 714.

The computing device 700 may include one or more general-purpose programmable central processing units (CPUs) 706A and 706B, herein generically referred to as the processor 706. In certain embodiments, a processor may be any electronic device having a datapath for executing a sequence of programmed instructions and capable of performing arithmetic logic computations (e.g., using an arithmetic logic unit), include application specific integrated circuits, and field programmable gate arrays. In an embodiment, the computing device 700 may contain multiple processors; however, in another embodiment, the computing device 700 may alternatively be a single CPU device. Each processor 706 executes instructions stored in the memory 712.

The computing device 700 may include a bus interface unit 708 to handle communications among the processor 706, the memory 712, the display system 704, and the I/O bus interface unit 714. The I/O bus interface unit 714 may be coupled with the I/O bus 716 for transferring data to and from the various I/O units. The I/O bus interface unit 714 may communicate with multiple I/O interface units 718, 720, 722, and 724, which are also known as I/O processors (IOPs) or I/O adapters (IOAs), through the I/O bus 716. The display system 704 may include a display controller, a display memory, or both. The display controller may provide video, audio, or both types of data to a display device 702. The display memory may be a dedicated memory for buffering video data. The display system 704 may be coupled with a display device 702, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 704 may be on board an integrated circuit that also includes the processor 706. In addition, one or more of the functions provided by the bus interface unit 708 may be on board an integrated circuit that also includes the processor 706.

The I/O interface units support communication with a variety of storage and I/O devices. For example, the terminal interface unit 718 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 726 and the computing device 700, may receive output data via the user output devices. For example, a user interface may be presented via the user I/O device 726, such as displayed on a display device, played via a speaker, or printed via a printer.

The storage interface 720 supports the attachment of one or more disk drives or direct access storage devices 728 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 728 may be implemented via any type of secondary storage device. The contents of the memory 712, or any portion thereof, may be stored to and retrieved from the storage device 728 as needed. The I/O device interface 722 provides an interface to any of various other I/O devices or devices of other types, such as printers or fax machines. The network interface 724 provides one or more communication paths from the computing device 700 to other digital devices and computer systems.

Although the computing device 700 shown in FIG. 7 illustrates a particular bus structure providing a direct communication path among the processors 706, the memory 712, the bus interface 708, the display system 704, and the I/O bus interface unit 714, in alternative embodiments the computing device 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 714 and the I/O bus 708 are shown as single respective units, the computing device 700, may include multiple I/O bus interface units 714 and/or multiple I/O buses 716. While multiple I/O interface units are shown, which separate the I/O bus 716 from various communication paths running to the various I/O devices, in other embodiments, some or all of the I/O devices are connected directly to one or more system I/O buses.

In various embodiments, the computing device 700 is a multi-user mainframe computer system, a single-user system, or a server computer or similar device that has little or no direct user interface, but receives requests from other computer systems (clients). In other embodiments, the computing device 700 may be implemented as a desktop computer, portable computer, laptop or notebook computer, tablet computer, pocket computer, telephone, smart phone, or any other suitable type of electronic device.

In an embodiment, the memory 712 may include a random-access semiconductor memory, storage device, or storage medium (either volatile or non-volatile) for storing or encoding data and programs. In another embodiment, the memory 712 represents the entire virtual memory of the computing device 700, and may also include the virtual memory of other computer systems coupled to the computing device 700 or connected via a network 730. The memory 712 may be a single monolithic entity, but in other embodiments the memory 712 may include a hierarchy of caches and other memory devices. For example, memory may exist in multiple levels of caches, and these caches may be further divided by function, so that one cache holds instructions while another holds non-instruction data, which is used by the processor. Memory 712 may be further distributed and associated with different CPUs or sets of CPUs, as is known in any various so-called non-uniform memory access (NUMA) computer architectures.

The memory 712 may store all or a portion of the software applications, modules, and other software components and data shown in FIGS. 1-6. The memory 712 may be an embodiment of the memory 415 (FIG. 4) or the memory 460 (FIG. 4), storing a service manager, IME configuration profiles, and user profiles. These programs and data structures are illustrated in FIGS. 1-6 as being included within the memory 712 in the computing device 700; however, in other embodiments, some or all of them may be on different computer systems and may be accessed remotely, e.g., via a network 730. The computing device 700 may use virtual addressing mechanisms that allow the programs of the computing device 700 to behave as if they only have access to a large, single storage entity instead of access to multiple, smaller storage entities. Thus, while the components and data shown in FIGS. 1-6 are illustrated as being included within the memory 712, these components and data are not necessarily all completely contained in the same storage device at the same time. Although the components and data shown in FIGS. 1-6 are illustrated as being separate entities, in other embodiments some of them, portions of some of them, or all of them may be packaged together.

In an embodiment, the components and data shown in FIGS. 1-6 may include instructions or statements that execute on the processor 706 or instructions or statements that are interpreted by instructions or statements that execute the processor 706 to carry out the functions as further described below. In another embodiment, the components shown in FIGS. 1-6 may be implemented in hardware via semiconductor devices, chips, logical gates, circuits, circuit cards, and/or other physical hardware devices in lieu of, or in addition to, a processor-based system. In an embodiment, the components shown in FIGS. 1-6 may include data in addition to instructions or statements.

FIG. 7 is intended to depict representative components of the computing device 700. Individual components, however, may have greater complexity than represented in FIG. 7. In FIG. 7, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing deployment of input method engines (IMEs) to computing devices in proximate relation to endpoint devices within a data communication network, the method comprising:

receiving software logic data indicating deployment rules for deploying a first IME executing on a first computing device in the data communication network to a second computing device in the data communication network, the deployment rules indicating a threshold condition for deploying the first IME to the second computing device;

receiving software data structure identifying configuration preferences of a user of an endpoint device, the configuration preferences associating the user with a configuration of the first IME, wherein the user's accesses the first IME is routed in the data communication network through the endpoint device and second computing device;

monitoring the usage of the first IME, wherein the monitoring includes obtaining usage data associated with the user's access to the first IME through the second computing device;

determining, based on the monitoring and the software logic data and the software data structure, whether the threshold condition is satisfied; and deploying the first IME to the second computing device when the threshold condition is satisfied.

2. The method of claim 1, wherein communication latency between the first computing device and the endpoint computing device is greater than communication latency between the second computing device and the endpoint computing device.

3. The method of claim 1, wherein the first computing device is separated from the end point computing device by a first number of intermediate computing devices, and the second computing device is separated from the endpoint computing device by a second number of computing devices, wherein the second number is smaller than the first number.

4. The method of claim 1, wherein the threshold condition is satisfied when a threshold number of users access the first IME though the second computing device.

5. The method of claim 1, wherein the receiving the software data structure comprises:
receiving configuration preferences associated with two or more users of the first IME; and
merging the configuration preferences to generate the software data structure.

6. The method of claim 1, wherein the threshold condition is at least one of a number of users accessing the IME through the second computing system, a volume of data exchanged between the IME and a user of the IME, the frequency with which a user accesses the IME through the second computing system, and a span of time since the IME was last accessed.

7. The method of claim 1, wherein the second computing device is an edge server.

8. The method of claim 1, wherein the second computing device and is an access point.

9. The method of claim 1, wherein deployment rules further indicate a criteria for removing a second IME executing on the second computing device from the second computing device before deploying the first IME to the second computing device.

10. A system for managing deployment of input method engines (IMEs) to a computing device in proximate relation to an endpoint device within a data communication network, the system comprising:
a mediator component to configured to receive a software data structure, wherein the software data structure identifies configuration preferences of a user of the endpoint device, the configuration preferences associating the user with a configuration a first IME executing on a first computing device in the data communication network, wherein the user accesses the first IME through a communication channel routed through the endpoint device and the second computing device;
a usage monitor component configured to monitor the usage of the first IME, wherein the usage includes usage data associated with the user's access to the first IME through the second computing device; and
a service manager component coupled to the mediator component and the usage monitor component, the service manager component configured to:
receive software logic data, wherein the software logic data indicates deployment rules for deploying the first IME to the second computing device in the network environment, the deployment rules indicating a threshold condition for deploying the first IME to the second computing device;
determine, based on the monitoring and the software logic data and the software data structure, whether the threshold condition device is satisfied; and
deploy the first IME to the second computing device when the threshold condition is satisfied.

11. The system of claim 10, wherein communication latency between the first computing device and the endpoint computing device is greater than communication latency between the second computing device and the endpoint computing device.

12. The system of claim 10, wherein the first computing device is separated from the end point computing device by a first number of intermediate computing devices, and the second computing device is separated from the endpoint computing device by a second number of computing devices, wherein the second number is smaller than the first number.

13. The system of claim 10, wherein the threshold condition is satisfied when a threshold number of users access the first IME though the second computing device.

14. The system of claim 10, wherein the mediator component is further configured to:
receive configuration preferences associated with two or more users of the first IME; and
merge the configuration preferences to generate the software data structure.

15. The system of claim 10, wherein the threshold condition is at least one of a number of users accessing the IME through the second computing system, a volume of data exchanged between the IME and a user of the IME, the frequency with which a user accesses the IME through the second computing system, and a span of time since the IME was last accessed.

16. The system of claim 10, wherein the second computing device is an edge server.

17. The system of claim 10, wherein the second computing device and is an access point.

18. A computer program product for managing deployment of input method engines (IMEs) to computing devices in proximate relation to endpoint devices within a data communication network, the computer program product including a computer readable storage medium having program instructions embodied therewith, wherein the computer readable storage medium is not a transitory signal per se, the program instructions executable by a processing circuit to cause the processing circuit to perform a method comprising:
receiving software logic data indicating deployment rules for deploying a first IME executing on a first computing device in the data communication network to a second computing device in the data communication network, the deployment rules indicating a threshold condition for deploying the first IME to the second computing device;
receiving software data structure identifying configuration preferences of a user of an endpoint device, the configuration preferences associating the user with a configuration of the first IME, wherein the user's accesses the first IME is routed in the data communication network through the endpoint device and second computing device;
monitoring the usage of the first IME, wherein the monitoring includes obtaining usage data associated with the user's access to the first IME through the second computing device;

determining, based on the monitoring and the software logic data and the software data structure, whether the threshold condition is satisfied; and deploying the first IME to the second computing device when the threshold condition is satisfied.

19. The computer program product of claim 18, wherein the threshold condition is satisfied when a threshold number of users access the first IME though the second computing device.

20. The computer program product of claim 18, wherein communication latency between the first computing device and the endpoint computing device is greater than communication latency between the second computing device and the endpoint computing device.

* * * * *